March 2, 1954 W. H. GAY ET AL 2,670,714
CONTROL MECHANISM FOR TRANSMISSIONS
Filed March 4, 1950 6 Sheets-Sheet 1
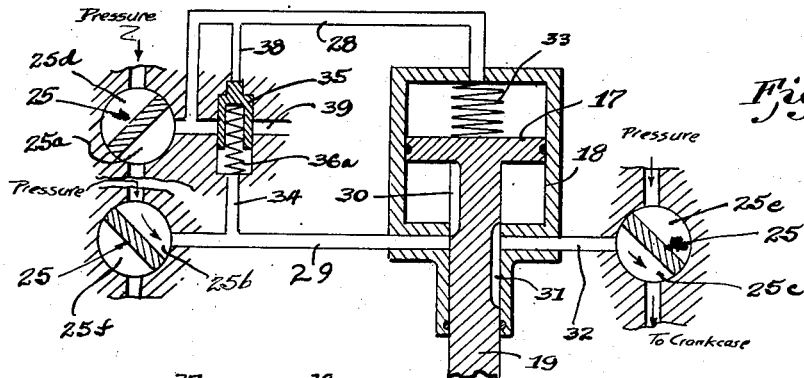
Fig. 1 (NEUTRAL)
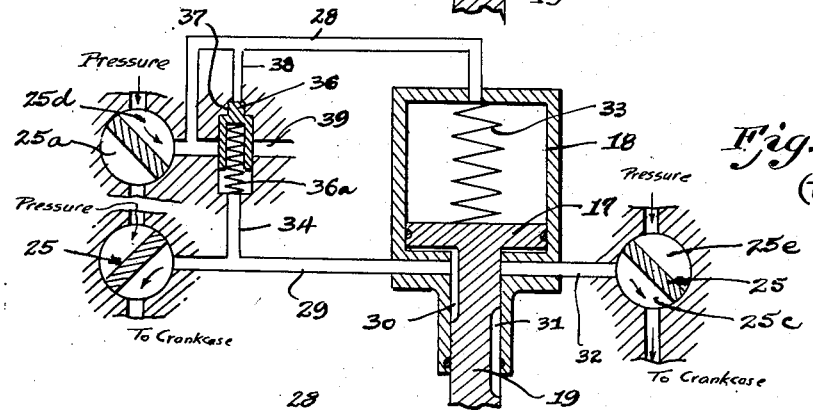
Fig. 2 (FORWARD)
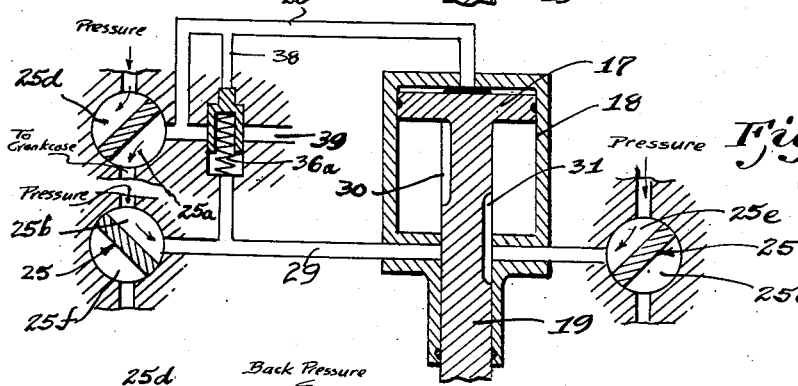
Fig. 4 (REVERSE)
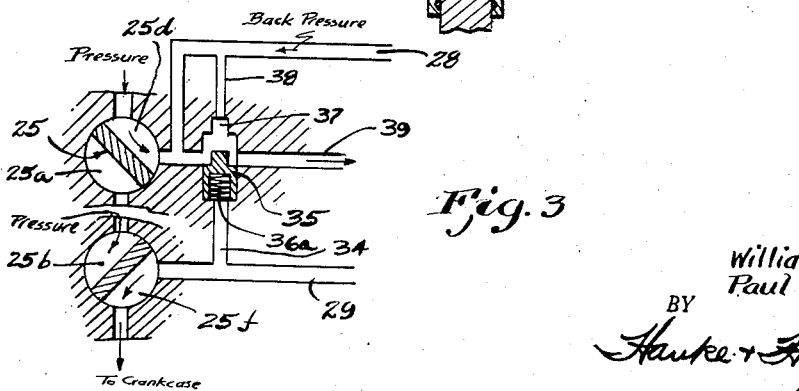
Fig. 3
INVENTORS
William H. Gay
Paul A. Engstrom
BY Hauke + Hardesty
Attorneys.

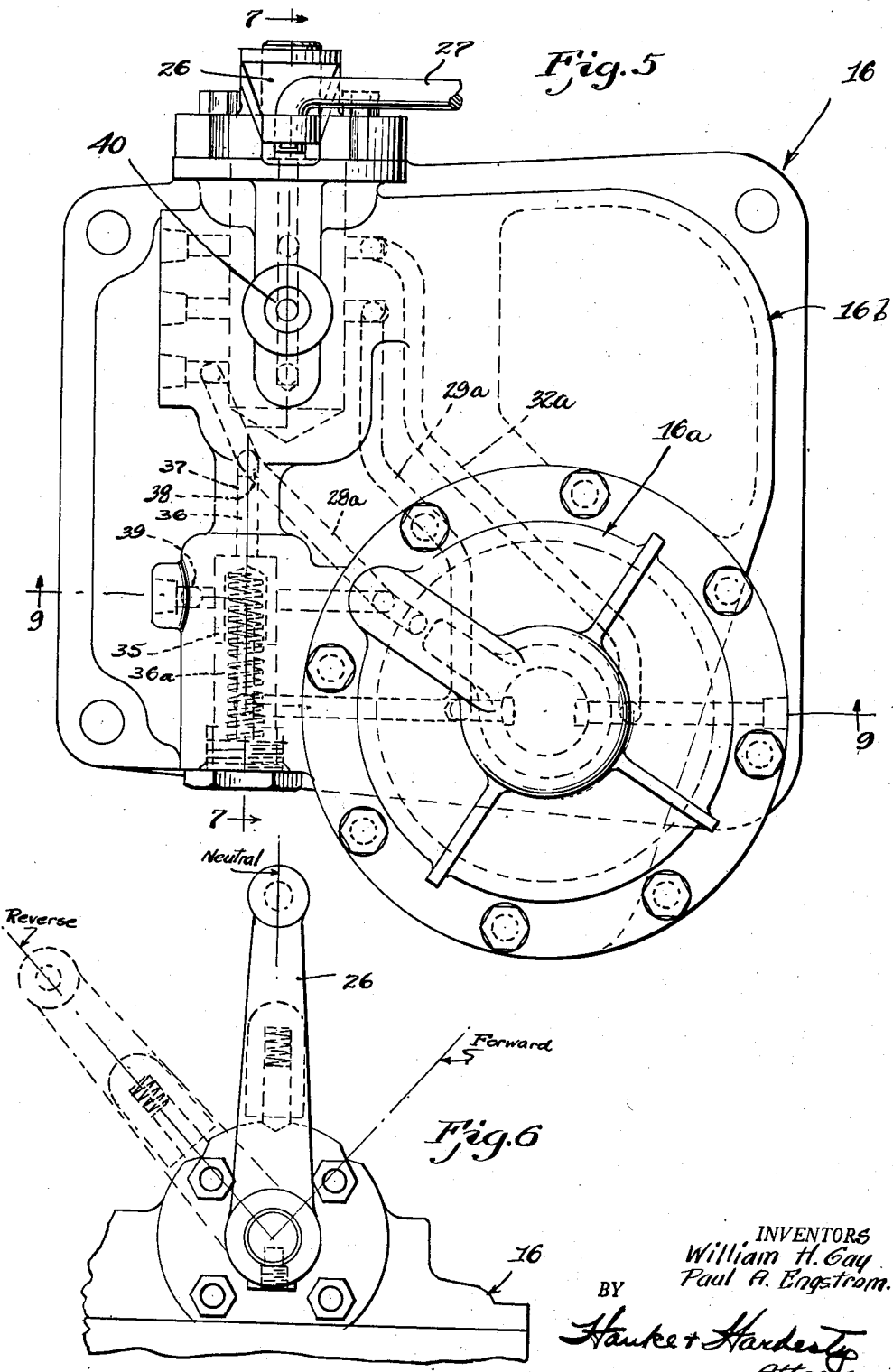

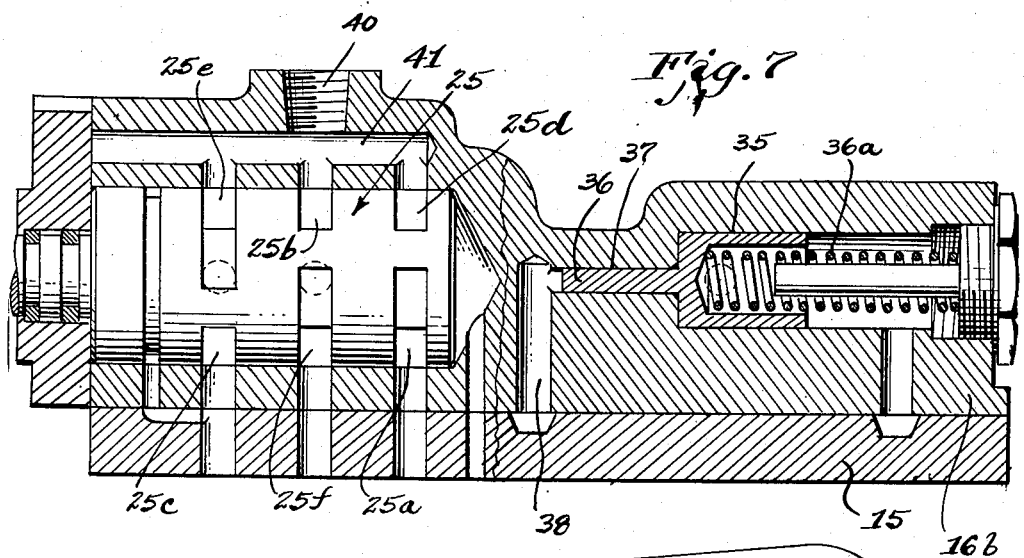
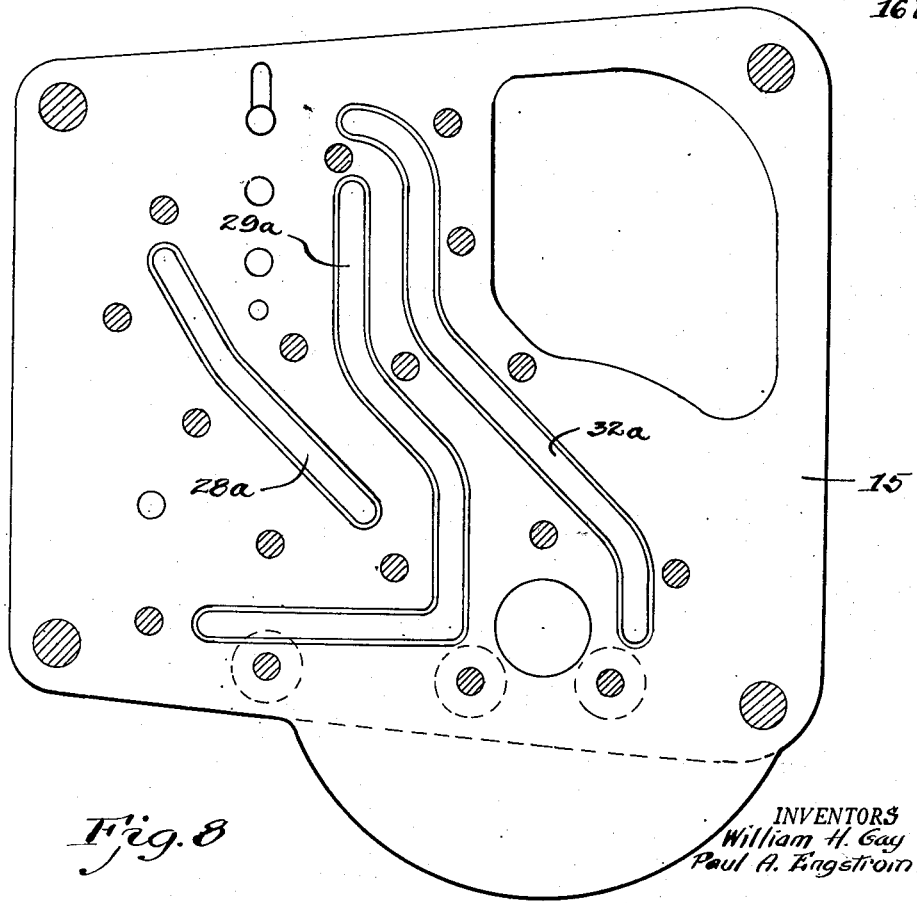

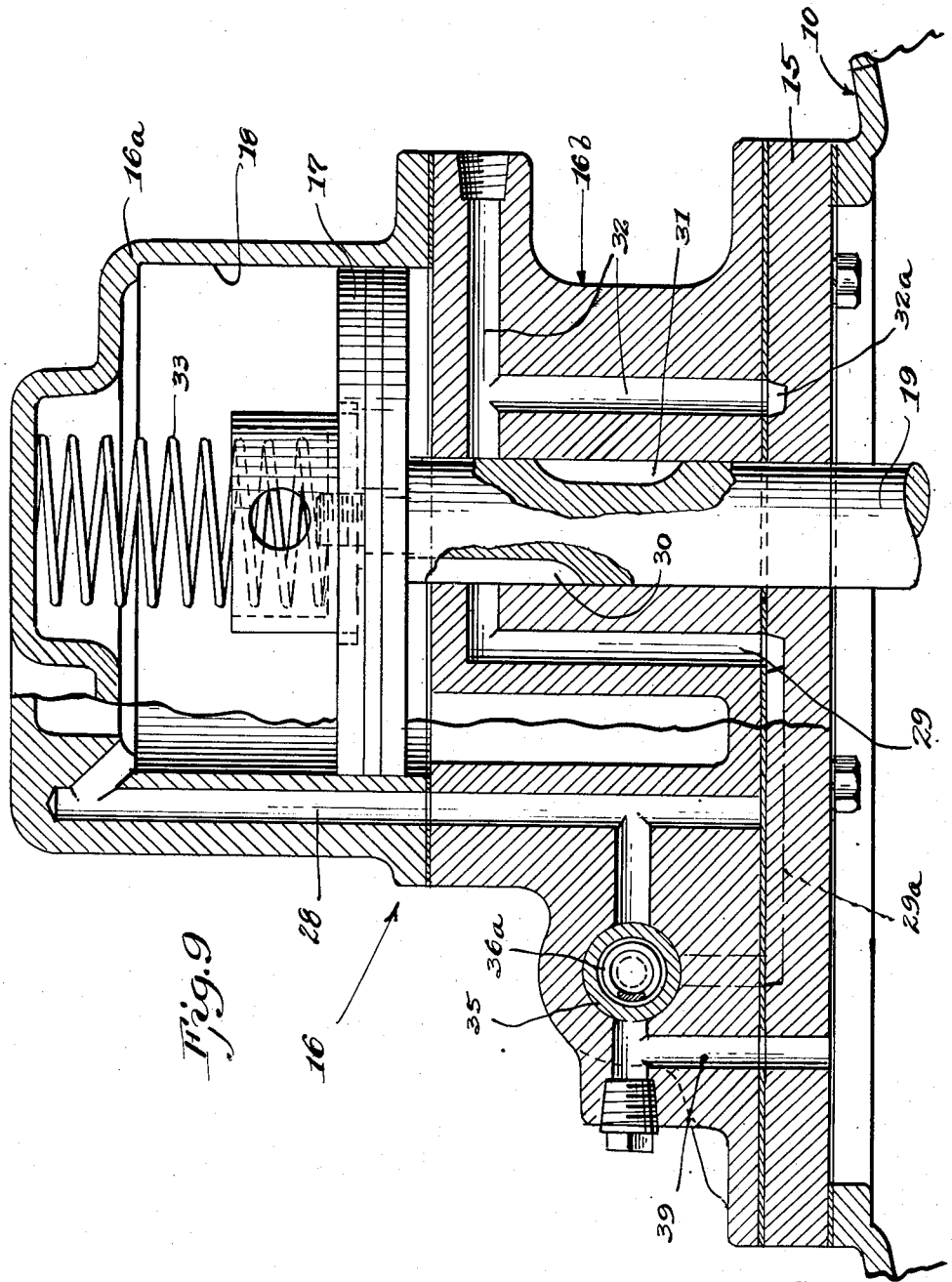

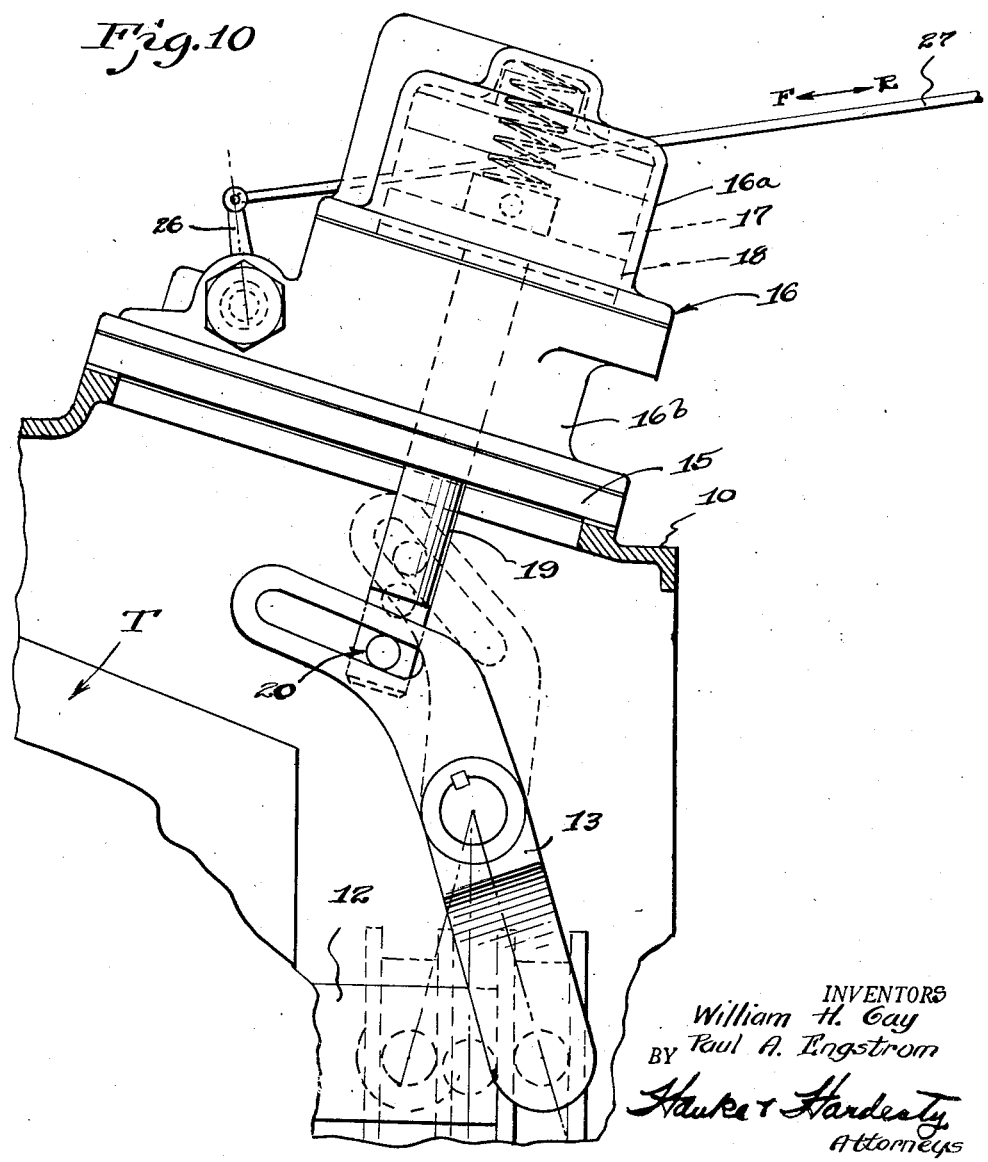

March 2, 1954 W. H. GAY ET AL 2,670,714
CONTROL MECHANISM FOR TRANSMISSIONS
Filed March 4, 1950 6 Sheets-Sheet 6
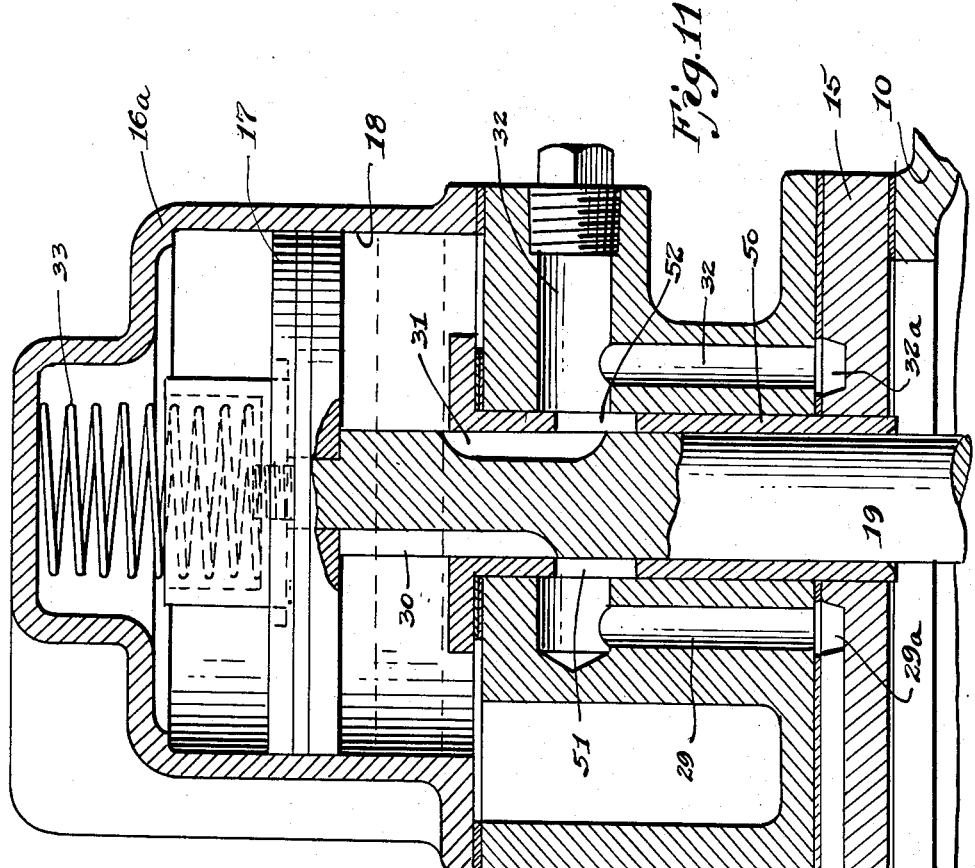
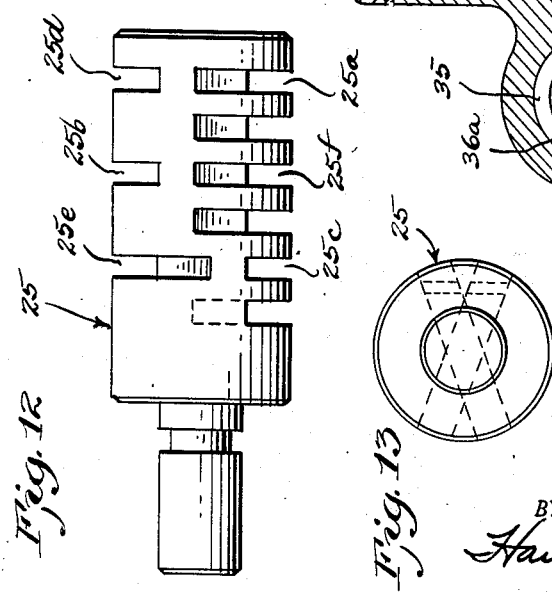
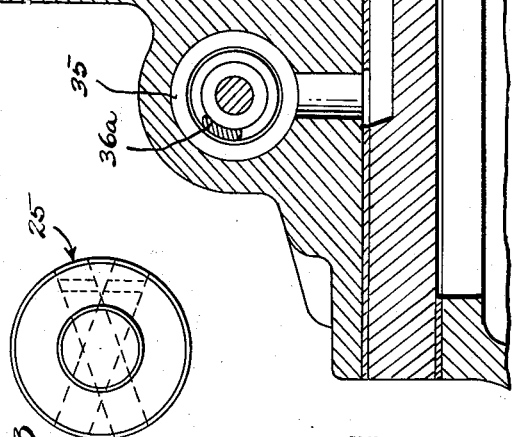
INVENTORS
William H. Gay
Paul A. Engstrom
BY
Hauke & Harderty
Attorneys.

Patented Mar. 2, 1954

2,670,714

UNITED STATES PATENT OFFICE 2,670,714

CONTROL MECHANISM FOR TRANSMISSIONS

William H. Gay and Paul A. Engstrom, Detroit, Mich., assignors to Gray Marine Motor Company, Detroit, Mich., a corporation of Michigan Application March 4, 1950, Serial No. 147,584

4 Claims. (Cl. 121—38)

1

Our invention relates to a transmission control mechanism, and more particularly to a hydraulic control for marine engines to shift same readily in forward, reverse or neutral drive.

It is the object of our present invention to provide for ease in engine control by providing an improved hydraulic control mechanism in which various vents and relief valves are incorporated in the system to permit the transmission to be more readily and easily shifted from one to the other of the forward or reverse drive, and in so mounting the controls as to directly connect same to the transmission shifting mechanism.

For a more detailed understanding of my invention reference may be had to the accompanying drawings illustrating a preferred embodiment of our invention, and in which—

Fig. 1 is a diagrammatic view showing the control in "neutral."

Fig. 2 is a similar diagrammatic view of the control in "forward."

Fig. 3 is a diagrammatic view showing the relief valve and its operation.

Fig. 4 is a diagrammatic view showing the control in "reverse."

Fig. 5 is a plan view of the control means.

Fig. 6 is a detail view of one of the valves and the actuator lever.

Fig. 7 is a detail sectional view of the distributor valve taken on the line 7—7 of Fig. 5.

Fig. 8 is a plan view of the adapter plate covering the transmission.

Fig. 9 is a transverse sectional view taken substantially on the line 9—9 of Fig. 5.

Fig. 10 is a view in elevation of the control means and showing the same mounted on the transmission housing and the connections to the transmission shifting mechanism.

Fig. 11 is a sectional view somewhat similar to Fig. 9 but showing a modified construction.

Fig. 12 is an elevational view of the distributor valve, and

Fig. 13 is an end view thereof.

The hydraulic transmission control, as illustrated in the accompanying drawing, shows same mounted directly on the transmission case 10. Conventional transmission mechanism, indicated as a whole by reference character T, is housed within this case 10, and embodies a shiftable shaft 12, actuated by a lever 13. The conventional transmission shifting means includes somewhere in the system any suitable means so that when the shifting means is adjusted in any one of its operating positions such as "Forward," "Reverse," or "Neutral," the same will remain in such adjusted

2 position until it is positively shifted to another adjusted position.

The present invention utilizes a conventional transmission and relates mainly to the control of said transmission. This control is mounted on the transmission case by first removing the conventional cover plate and then bolting the base of the control assembly directly to the case, the base of the control assembly being constructed similarly to the cover plate insofar as the bolt holes are concerned.

The hydraulic transmission control comprises an adapter plate 15 assembled intermediate the transmission case 10 and the control housing or casing 16, consisting of upper and lower casing portions respectively identified by reference characters 16a and 16b. The various valves and oil passages are embodied in these casing parts 16a and 16b, and adapter plate 15 and the hydraulically actuated piston is supported in the cylinder casing forming a part of the upper casing 16a. A piston 17 is operable in cylinder 18 and the stem 19 is secured to the piston and to the lever 13 at its lower end by the pin and slot arrangement 20 as clearly shown in Fig. 10, said stem 19 being preferably securely carried or locked to the piston 17.

The operation of the piston may be clearly understood by referring to Figs. 1 to 4 inclusive. The distributor valve 25, actuated by lever 26 by means of the manually operated rod or link 27, is adjusted to align the various valve passages with the conduits or leads in the control casing to feed oil under pressure to the piston cylinder 18 and to scavenge same as well, whereby to advance or retract the piston for selectively adjusting the transmission to Forward, Reverse or Neutral positions.

Assuming we start from a neutral position, the valve 25 is adjusted to scavenge the cylinder space above the piston 17 by connecting oil passage 28 leading to the upper piston cylinder through valve passage 25a to the transmission crankcase. Oil line or passage 29 is connected to the source of oil pressure by valve passage 25b, and is cut off by the piston stem when the piston is moved to a point midway of the cylinder 18, said passage 29 connecting with a groove 30 in the piston rod or stem 19. When the piston tends to move upwardly past center, the groove 31 in the piston stem is opened to the cylinder space below the piston and thus said cylinder space below the piston is vented to the crankcase through oil line or passage 32 and valve passage 25c, the spring 33 exerting a force on top of the piston to maintain same at the mid point of the cylinder. Oil line 29 is connected by oil line or passage 34 to the underside of the spring biased relief valve 35 so that when line 29 is connected with pressure, the relief valve is closed. The spring 36 bearing on the relief valve to close same is designed to hold the relief valve closed against a predetermined pressure tending to open same, this predetermined pressure necessary to open the relief valve being greater and preferably about ten pounds or so in excess of the pressure required to move the piston 17 to the "Forward" position.

To operate the engine at forward speed, the transmission must of course be shifted or adjusted for forward operation, but after once being set to forward operation, it is desirable to vent both sides of the piston, the conventional transmission structure itself being constructed to maintain the transmission adjustment as set. Thus the present hydraulic control operation is comparatively simple, the valve 25 being rotated to register the line 28 with valve port 25d (Fig. 2) and the source of oil pressure. The oil pressure being conducted to the top of the piston cylinder 18 forces the piston 17 down (see Fig. 2) and as oil under pressure is being continually fed to line 28, a back pressure begins to be immediately built up, and this back pressure begins to push the relief valve 35 off its seat. This relief valve is provided with a reduced diameter portion 36 operating in cylinder 37 being subject to oil pressure through line or passage 38 openly connected to line 28. When the relief valve is moved a predetermined amount, the entire enlarged top face of the valve is exposed to the oil pressure and same is forcibly moved to the position shown in Fig. 3 thereby connecting passage 28 to the vent passage 39, said passage 29 being vented to the crankcase through valve part 25f.

To reverse the engine, the valve 25 is adjusted by moving the handle 26 to reverse position, but naturally passing through neutral position, and same may be moved directly to reverse or may dwell awhile in neutral, or the transmission can be set for neutral by merely moving the handle 26 to neutral position.

Suppose we first move the handle 26 for neutral adjustment, the valve 25 is positioned or adjusted as shown in Fig. 1 and the piston is moved to a point midway of the cylinder. The handle may as well be moved directly from forward to reverse, but when moving from neutral to full reverse (see Fig. 4), the passage 29 remains connected with the oil pressure and valve port 25e connects line 32 to oil pressure. Line 28 is vented to the crackcase through valve port 25a.

The valve 25 is rotated about 90 degrees when moving from Forward to Reverse (see Fig. 6). While said diagrammatic views 1 to 4 inclusive illustrate the general principles of the invention, the practical application is illustrated in the remaining figures. Attention is directed to Fig. 5 showing in plan a view of a hydraulic control means, as constructed in production but incorporating the principles as illustrated diagrammatically in Figs. 1 to 4 inclusive, 40 designates the oil pressure inlet, which connects with the longitudinal passage or header 41 leading to the various valve inlets connected with valve ports 25d, 25b and 25e. Valve ports 25a, 25e and 25f connect the said lines 28, 32 and 29 with the crankcase. In order to construct this unit to most easily conduct the oil under pressure to the places where it is put to work, the lines or passages 28, 29 and 32 comprise passages in the casing 16b, which connect with passages in the adapter plate respectively identified by reference characters 28a, 29a and 32a.

In Fig. 11, we have illustrated a modified construction in which the casing is provided with a sleeve 50 supporting the piston rod or stem 19. This sleeve being ported at 51 and 52 to respectively register with the outlets of passages 29 and 32.

It will be apparent that various changes and modifications may be made herein without departing from the spirit of our invention or from the scope of the appended claims.

We claim:

1. A fluid control mechanism for a transmission comprising an actuating member adapted to be connected with the transmission shifting mechanism, a piston and cylinder assembly having the piston connected with said actuating member, and means actuating said piston and comprising a fluid pressure system having conduits conducting fluid pressure to said cylinder and valve means constructed to control the flow of fluid to said cylinder, and a relief valve interposed in the fluid pressure conduit of said system utilized to conduct fluid pressure to the cylinder and to advance the piston when shifting into forward drive of said transmission, said relief valve set to be actuated by reason of a predetermined build up of back pressure subsequent to full advance of said piston when subjected to said fluid pressure, said relief valve being thereby actuated to vent the aforesaid fluid pressure conduit of the fluid pressure system just previously utilized to advance said piston, other means for venting said other fluid pressure conduits of said fluid pressure system while the piston is being advanced as aforesaid, said valve means operable to close off connection to the cylinder on top of the piston to the fluid pressure system and simultaneously connect the cylinder on the under side of said piston to the fluid pressure to selectively return said piston part way or all the way to respectively actuate the transmission shifting mechanism to neutral or reverse drive, and a connection with the last mentioned fluid pressure system and said relief valve to return said relief valve to its original position designed to close off said first mentioned part of said fluid pressure system to said vent, through said relief valve, said valve means having ported passages connecting the conduit connected with the cylinder on top of said piston with a vent passage independently of the vent passage controlled by said relief valve.

2. In a fluid pressure control mechanism for a transmission, a casing having a cylinder, a piston operable in said cylinder, a downwardly extending shaft secured to said piston, a bore in said casing through which said shaft extends, a source of fluid pressure supply, said casing having a plurality of fluid passages one of which terminates at the top of the cylinder, the other passages terminating in ports in the wall of said bore, a distributor valve operable to selectively control communication of said passages to said source of fluid pressure supply, said shaft having separate axially extending passages axially spaced from each other but slightly overlapped and serving to conduct fluid pressure from the port in said bore in registry therewith to the cylinder on the underside of said piston, one of said shaft passages comprising a predetermined length and normally in registry with a port and opening into said cylinder when the piston is disposed at the bottom of the stroke and operable to cut off communication with the fluid pressure supply when the piston has travelled substantially half way of said cylinder, said other shaft passage disposed to connect the cylinder on the underside of the piston with the fluid pressure supply to move said piston to the top of its stroke, and means connecting said shaft to the transmission shifting mechanism and operable to selectively dispose same in "Forward," "Neutral" or "Reverse" drive.

3. In a fluid pressure control mechanism for a transmission, a casing having a cylinder, a piston operable in said cylinder, a downwardly extending shaft secured to said piston, a bore in said casing through which said shaft extends, a source of fluid pressure supply, said casing having a plurality of fluid passages one of which terminates at the top of the cylinder, the other passages terminating in ports in the wall of said bore, a distributor valve operable to selectively control communication of said passages to said source of fluid pressure supply, said shaft having separate axially extending passages axially spaced from each other but slightly overlapped and serving to conduct fluid pressure from the port in said bore in registry therewith to the cylinder on the underside of said piston, one of said shaft passages comprising a predetermined length and normally in registry with a port and opening into said cylinder when the piston is disposed at the bottom of its stroke and operable to cut off communication with the fluid pressure supply when the piston has travelled substantially half way of said cylinder, said other shaft passage disposed to connect the cylinder on the underside of the piston with the fluid pressure supply to move said piston to the top of its stroke, and means connecting said shaft to the transmission shifting mechanism and operable to selectively dispose same in "Forward," "Neutral" or "Reverse" drive, said distributor valve constructed to vent both said casing passages leading to said bore on opening said casing passage leading to the top of the cylinder to said fluid pressure, to open said first mentioned shaft passage and associated casing passage to fluid pressure and to vent all said other casing passages and associated casing passages to fluid pressure and to vent said other casing passage to simultaneously vent the cylinder above the piston.

4. A fluid pressure control mechanism for actuating a transmission to selectively shift same from neutral to forward or reverse drive or vice versa, and comprising a casing having a cylinder and a plurality of passages, a piston operable in said cylinder and connected to the transmission shifting mechanism, a source of fluid pressure supply, and valve means controlling fluid pressure flow from said source through said passages to said cylinder for controlling the piston operation, said valve means operable to selectively open one end of the cylinder to fluid pressure through one of said passages while venting the other end of said cylinder through said other passages and including separate passage means movably supported in said casing for introducing fluid pressure at one end of the cylinder, one of said last mentioned passage means connected with vent means and operable to vent the cylinder when said other of said separate passage means introducing fluid pressure to the cylinder is open to fluid pressure, only when said piston has moved substantially half way of the cylinder, whereby to locate the piston at rest half way of the cylinder and to maintain said transmission in neutral, said valve means operable to introduce fluid under pressure to both said separate passage means to move the piston to its full stroke for setting said transmission in reverse drive.

WILLIAM H. GAY.
PAUL A. ENGSTROM.

References Cited in the file of this patent

UNITED STATES PATENTS

| Number | Name | Date |
|---|---|---|
| 512,142 | Wood | Jan. 2, 1894 |
| 1,046,529 | Winton | Dec. 10, 1912 |
| 1,134,608 | Gottschalk | Apr. 6, 1915 |
| 1,847,890 | Osborne | Mar. 1, 1932 |
| 1,952,806 | Hyland | Mar. 27, 1934 |
| 1,963,444 | Mullins | June 19, 1934 |
| 2,012,398 | McKenzie | Aug. 27, 1935 |
| 2,056,006 | Hodgkins | Sept. 29, 1936 |
| 2,100,312 | Fawick | Nov. 30, 1937 |
| 2,129,083 | Carter | Sept. 6, 1938 |
| 2,139,723 | Carter | Dec. 13, 1938 |
| 2,181,471 | Velo | Nov. 28, 1939 |
| 2,445,716 | Sternberg | July 20, 1948 |